United States Patent [19]

Avera

[11] 4,175,976

[45] Nov. 27, 1979

[54] NON-DUSTING AGENT AND METHOD OF MANUFACTURE

[76] Inventor: Fitzhugh L. Avera, 1809 Yale Dr., Alameda, Calif. 94501

[21] Appl. No.: 894,839

[22] Filed: Apr. 10, 1978

Related U.S. Application Data

[63] Continuation-in-part of Ser. No. 758,076, Jan. 10, 1977, Pat. No. 4,116,711, which is a continuation-in-part of Ser. No. 590,420, Jun. 26, 1975, abandoned.

[51] Int. Cl.$^2$ .......................... C09C 1/44; C09C 1/58; C09D 3/10
[52] U.S. Cl. ..................................... 106/162; 106/217; 106/291; 106/307; 106/308 C; 106/308 Q; 106/309; 241/23; 264/144
[58] Field of Search ............... 106/308 Q, 308 C, 307, 106/162, 217, 291; 264/144, 117; 426/658, 457, 96, 97, 540

[56] References Cited

U.S. PATENT DOCUMENTS

| | | | |
|---|---|---|---|
| 1,811,384 | 6/1931 | Collier | 106/217 |
| 2,040,770 | 5/1936 | Grote | 264/144 |
| 2,250,287 | 7/1941 | Work et al. | 106/217 |
| 2,296,382 | 9/1942 | Fischer et al. | 106/308 C |
| 2,427,238 | 9/1947 | Swart | 106/307 |
| 2,807,559 | 9/1957 | Steiner | 426/96 |
| 3,851,083 | 11/1974 | Brooking et al. | 426/658 |
| 3,923,680 | 12/1975 | Roeder et al. | 264/117 |

FOREIGN PATENT DOCUMENTS

421802 10/1933 United Kingdom .
896067 5/1962 United Kingdom .

OTHER PUBLICATIONS

Handbook of Chemistry & Physics (50th ed.), pub. 1970, The Chemical Rubber Co., Cleveland, Ohio, pp. C-363, C-491.

*Primary Examiner*—Helen M. McCarthy
*Attorney, Agent, or Firm*—Merchant, Gould, Smith, Edell, Welter & Schmidt

[57] ABSTRACT

A non-dusting, relatively coarse particulate material is prepared from a relatively more finely divided material such as a pigment and an organic binder comprising a solid hexahydric alcohol with little or no affinity for water and a melting point within the range of 60° to 200° C. The finely divided material and binder are blended and cast with the aid of an aqueous carrier medium, and then heated to form a solid layer which can be broken up into flake-like particles or chunks. These flakes or chunks are not "agglomerated" or "pelletized" in the usual sense of these terms. The relative fine particles in the flakes are, apparently, bound up in a solid suspension comprising an adherent film or matrix.

9 Claims, No Drawings

NON-DUSTING AGENT AND METHOD OF MANUFACTURE

CROSS-REFERENCE TO RELATED APPLICATIONS

This application is a continuation-in-part of my co-pending application Ser. No. 758,076, filed Jan. 10, 1977, now U.S. Pat. No. 4,116,711, issued Sept. 26, 1978, which in turn was a continuation-in-part of Ser. No. 590,420, filed June 26, 1975, now abandoned.

FIELD OF THE INVENTION

This invention relates to non-dusting materials including non-dusting coloring agents. One aspect of this invention relates to pigmented particles of a solid hexahydric alcohol. Another aspect of this invention relates to a process for forming a relatively finely divided material into relatively larger particles through the use of an organic pigment binder, the binder being a hexahydric alcohol. The resulting, relatively large particles are suitable for use as color-imparting additives for plastics, as a transport medium for fine particles, etc.

DESCRIPTION OF THE PRIOR ART

It is a common practice in the plastics industry to add finely divided pigments (e.g. pigments which will pass a 200 U.S. mesh screen or, more typically, a 325 U.S. mesh screen) to plastics, so that a manufactured plastic article (e.g. a molded article or extrudate) will have a desired color. These finely divided pigments can be organic or inorganic, e.g. metal oxides or the like. Although the finely divided pigments do an effective job of imparting or controlling color in the plastic, they are, unfortunately, subject to the phenomenon known as "dusting". Dusting of pigment results in a mass of airborne pigment particles throughout the plant or facility in which the plastic mixing operations are carried out. In some cases, the result is a veritable dust cloud which settles over everything and can cause cleaning problems and even health problems for the employees.

It is well known that finely divided pigment particles can be agglomerated with organic binders and the like. However, agglomerated pigments can have an entirely different set of problems associated with them. For example, the agglomerates may be too fragile for use in coloration of plastics. The preparation of colored bulk plastic (e.g. plastic pellets) can involve relatively drastic steps such as extrusion of a thin ribbon which is broken into the pellets. Furthermore, the compatibility of the organic binder with the plastic is a factor to consider. Any binder which might interfere with dispersibility in the plastic would pose a problem in a colored bulk plastic pelletizing operation.

The following U.S. Pat. Nos. are believed to be representative of the prior art in this field: 2,427,238, 3,657,982, 3,773,536, 3,607,335, 3,418,270, 3,767,444, 3,778,288, 3,787,221, 1,651,733, 2,662,031, 2,155,326, 3,387,983.

Of the foregoing references, the U.S. Pat. No. to Swart, 2,427,238, issued Sept. 9, 1947, contains an extensive disclosure of a technique for making pellets or agglomerates from finely divided carbon black particles.

SUMMARY OF THE INVENTION

It has now been found that a flake-like mass comprising relatively large, non-dusting particles can be made from a solid hexahydric alcohol and a finely divided material such as a pigment. These flake-like particles are believed to be essentially solid suspensions of the finely divided material within an enclosing or adhering film or matrix of the solid hexahydric alcohol. The flake-like mass can be made by a variety of techniques involving a liquid phase through which the finely divided material is uniformly distributed (e.g. dispersed). The finely divided material is preferably essentially insoluble in this liquid phase. The liquid phase can be a molten solid or a solution comprising the hexahydric dissolved in a volatile liquid solvent such as water. The preferred method for making the flake-like mass involves the following steps:

(a) blending a minor amount of the hexahydric alcohol with a major amount of the finely divided pigment in an aqueous carrier medium;

(b) casting a wet layer of the mixture formed in step (a) onto a substrate;

(c) heating the wet layer to a temperature sufficient to evaporate water at the ambient pressure (e.g. at 1 atmosphere pressure), the heating being continued until it has driven off essentially all of the chemically unassociated water in the layer;

(d) solidifying (e.g. crystallizing) the hexahydric alcohol in situ in the layer; and (e) removing the resulting coherent dried layer from the substrate.

To obtain the preferred, randomly shaped flake-like form, the dried coherent layer is comminuted, i.e. broken up into pieces which are orders of magnitude larger than individual particles of the finely divided pigment. Thus, while the typical finely divided pigment will pass a 325 mesh screen, the comminuted mass of dried flakes will be, for all practical purposes, essentially retained on a 325 mesh screen or, preferably, a 200 mesh (U.S. Standard) screen. At least some of the particles in the comminuted mass can be large enough to be retained on a 10 mesh or even 3 mesh screen. The finely divided material is, of course, much finer than the flakes. The flakes generally have a thickness in excess of 25 microns and the finely divided material has an average particle size less than 5% the flake thickness. For example, if the finely divided material is a pigment, a major amount of it, when free, will be −325 U.S. mesh (i.e., it will pass a 325 U.S. Standard Sieve). For large flakes, −200 U.S. mesh finely divided particles can be used. For still larger flakes (e.g. +3 mesh flakes), even +200 mesh finely divided material can be used.

The breaking up of the dried layer can be carried out simultaneously with the removal step.

The preferred solid hexahydric alcohols have a melting point within the range of 60°–200° C., e.g. mannitol and sorbitol.

DETAILED DESCRIPTION

In the description which follows, the term "chemically unassociated water" should be understood to mean chemically unbound water, i.e. water which is physically trapped, adsorbed, or absorbed within a cast and/or dried slurry, precipitate, dried-down solution or the like. Thus, water of hydration, or other forms of water chemically bound or associated with crystals would not fall within the definition of "chemically unassociated water". By way of further explanation, it should be noted that some types of chemically associated water (e.g. water of hydration) can affect crystalline melting points, but physically retained water can be a simple diluent which does not affect the melting point of unassociated crystals.

As used herein, the terms "substantially free of chemically unassociated water" and "essentially free of chemically unassociated water" and "substantially moisture free" mean that only incidental or inadvertant amounts of chemically unassociated water are present, i.e., generally less than 1.0% and preferably less than 0.5%.

The term "particle size" refers to the longest dimension of the particles, in the case of fibrous, acicular, or other elongated particles. In the case of "spherical" particles, the "particle size" refers to the "diameter". (A "spherical" particle, from the standpoint of a pigment chemist, is any particle with an aspect ratio of less than about 2:1 and would include roughly cubical particles, roughly equilateral, three dimensional rhomboids, and the like.)

The term "generally inert toward water and hexahydric alcohols" means that no new, stable chemical compound is formed through interaction with water or hexahydric alcohols. Accordingly, chemical reactions which can reverse readily at moderate temperatures or upon evaporation of water, e.g. hydrogen bond formation, is permissible within the scope of the term and does not negative the "inertness".

As pointed out previously, the materials principally used in the process of this invention (other than water) are the finely divided material and the solid hexahydric alcohols. A detailed description of these materials follows.

Finely Divided Material

Among the preferred types of "finely divided material" are included any of the pigments conventionally used to impart color to plastics, rubbers, and the like, e.g. metal oxides, finely divided metals, organic pigments, elemental carbon black (including activated carbon and coarser types of particulate carbon), minerals (such as silicates), metal salts (carbonates, sulfates, etc.), and the like. The particle size of these finely divided materials typically ranges from the submicron or colloidal size ranges up to about 50 or even 100 microns. Mesh sizes, as mentioned previously, are typically finer than minus 200 U.S. mesh or even minus 325 U.S. mesh. Through combinations of these finely divided pigments, virtually any color can be provided, including white or black. As noted previously, larger flakes can include +200 U.S. mesh particles.

To illustrate the broad range of sizes in readily available pigments, calcium carbonate, barium sulfate, and other soft salts or minerals can be ground to a particle size ranging from 1 to 100 microns. Calcium carbonate precipitated from solution can be much finer, ranging from less than 1 micron up to about 5 microns.

The shape of the finely divided pigment particles is not critical—platelets, acicular particles, substantially spherical particles (i.e. particles with dimensional ratios approaching 1:1:1, such as spheroids, cubes, rhomboids, and stacked laminae), and the like all being operative in this invention.

The finely divided material need not be a "pigment" in the sense that its primary function need not be to impart color. For example, the finely divided material can be an absorbant or reactant for certain types of environment contaminants. The matrix then serves as a carrier or transport medium for the absorbant or reactant. As a further example, one may wish to ship a finely divided mineral such as asbestos or talc or silica which may be hazardous if inhaled. By converting the mineral to a flake-like mass according to this invention, it is rendered "non-dusting" and essentially non-hazardous.

The finely divided material can be organic or inorganic, provided it has a melting point above 100° C., preferably above 170° C. It is also preferred that the finely divided material have relatively minimal effects upon the non-Newtonian flow properties of water (e.g. that it be non-dilatant and non-thixotropic). It is also preferred that the finely divided solid material be generally insoluble in water and some of the common inorganic solvents. For example, it is ordinarily desirable that these finely divided solids be insoluble in solvents for hexahydric alcohols, e.g. pyridine, ethanol, etc.

In short, various finely divided solids which are presently being agglomerated, sintered, pelleted, briquetted, and otherwise enlarged in size can be enlarged in size by the technique of this invention, particularly when the binder or matrix component of the resulting flakes does not interfere with the use to which the finely divided solids are to be put. For example, if the finely divided material is a fuel or an impure metal, the hexahydric alcohol can burn off cleanly in the heat-generating or metal-refining furnace. Or, if the finely divided material is to be added to an aqueous medium, the matrix will dissolve away, leaving the particulate material in a more or less virgin form. In the art of treating or coloring plastics, the hexahydric alcohol can become a minor diluent which has a negligible effect upon the properties of the ultimately obtained molded or extruded plastic article.

Hexahydric Alcohols

The hexahydric alcohols used in this invention should have a melting point, under normal ambient conditions, which is above 60° C., but preferably below 200° C. Hexahydric alcohols of the formula $CH_2OH(CHOH)_4CH_2OH$ are generally preferred. Particularly preferred hexahydric alcohols (hexitols) are mannitol (D-form melting point 166° C., solubility 21.3 g/100 g water at 25° C., DL-form melting point 168° C.) and sorbitol (metastable form melts at 91°-92° C., stable melting point 97° C., anhydrous form 110°-114° C., solubility 235 g/100 g water). Optical isomerism of the hexitol is of no consequence, the D- and L- isomers being equally useful, as are the DL- mixtures or racemates. It is particularly desirable that the hexitol be non-hygroscopic and non-deliquescent, since the flake-like comminuted particles should stay dry after they have been manufactured. In this regard, mannitol is outstanding, since it is essentially non-deliquescent and is one of the least hygroscopic of the solid hexahydric alcohols. Sorbitol resists moisture uptake at relative humidities below 70%; at 70% R.H. and higher, it can be somewhat deliquescent. Both mannitol and sorbitol are readily available in commercial quantities. Sorbitol forms a stable hemi-hydrate and/or a monohydrate, but is available in anhydrous form. Excellent results have been obtained with hexitol blends comprising a major amount of mannitol, e.g. a 75:25 (by weight) mannitol:sorbitol blend.

Aqueous Media

The process of this invention preferably calls for the casting of the finely divided material and hexahydric alcohol in an aqueous carrier medium. The aqueous medium can be water, an aqueous solution of ammonia, or water containing a dissolved or dispersed surface active agent. The purpose of the ammonia or the surface active agent is to improve wetting of the pigment particles.

In the usual practice of this invention, the dry solids in the aqueous medium comprise 80-98% by weight of the finely divided material and 2-20% by weight of the essentially non-deliquescent hexahydric alcohol. (The 2-20% range applies to both anhydrous and hydrated forms of sorbitol.) The amount of surfactant used is less than 10% by weight of the total solids. On a parts-per-hundred of pigment (phr) basis, by weight, the amount of hexahydric alcohol can range from 2-25 phr (less preferably 1-30 phr), and the amount of surfactant is about 0-10 phr. Preferred amounts of hexahydric alcohol and surfactant are 2-10 phr and 0-5 phr, respectively.

The aqueous medium, after blending of the finely divided solids and the hexahydric alcohol can be a slurry, a dispersion, or the like. The preferred form of aqueous medium comprises (1) a solution comprising the hexahydric alcohol dissolved in water and (2) the finely divided solids dispersed more or less uniformly throughout the solution. The amount of water in the dispersion or slurry is not critical and can be less (on a weight/weight basis) than the pigment which is being suspended, e.g. about 40 or 50 parts per hundred (phr), based on the weight of the finely divided pigment. Alternatively, the water can be several times the weight of the pigment, e.g. 500 phr (same basis). To simplify drying, of course, it is preferred to use the minimum operable amount of water, which is typically an amount in sufficient volume to dissolve 1-30 parts by weight of hexahydric alcohol per 100 parts by weight of pigment as the resulting aqueous carrier medium. (As will be apparent to those skilled in the art, the dryness of the product of this invention makes the amount of water used to make the dry product largely a matter of convenience and simple operability more than anything else; in this preferred method, small amounts of water can be used so long as a pourable or castable continuous aqueous slurrying or suspending medium which will dissolve the hexahydric alcohol is provided.)

The Non-Dusting Product

The sheet-like (unbroken) product initially produced according to this invention is believed to be a solid suspension of finely divided solid material within an enclosing or adhering film or matrix of coherent solid hexahydric alcohol. This sheet-like product is readily converted into discrete particles, the discrete particles being generally flake-like, randomly shaped particles. To the naked eye, the comminuted product appears to be a mass of flakes or chunks, with the color of the enclosed or suspended pigment. The flakes or chunks fuse or melt readily at temperatures below 200° C. Microscopically, the flakes or chunks contain finely divided pigment bound up in a substantially moisture-free film or matrix which ordinarily is crystalline, but can be amorphous, the matrix being allowed to equilibrate with normal atmospheric relative humidity under the storing conditions which pertain prior to use. Thus, the flakes or chunks are not "agglomerates" or "pellets" in the usual sense of the term. In other words, they are generally randomly or irregularly shaped.

When a flat or slightly curved release substrate is used in the process of this invention (which is ordinarily preferred) the resulting comminuted flakes or chunks generally have two major, generally flat, generally parallel surfaces and one or more minor surfaces. The major surfaces can have any desired dimensions and typically are irregular in shape, since regular shapes would ordinarily have to be obtained by inconvenient methods such as die-cutting. Typically, the size of the flakes or chunks will depend upon the technique used to break up the dried layer made from the hexahydric alcohol and the finely divided pigment. The thickness of the flakes or chunks can also vary within wide limits and will depend upon the wet thickness of the cast slurry or suspension. Wet or dry thicknesses less than about 25 microns (about 1 mil) are believed to provide no particular advantage and can be difficult to handle, due to the inherent fragility of such thin flakes. Wet or dry thicknesses in excess of 75 microns are preferred. On the other hand, wet thicknesses greater than 5 or 10 millimeters can also be disadvantageous, due to the possibility of slower removal of trapped and adsorbed water. The wet thickness generally ranges from 0.1 to 5 millimeters, the preferred thickness being 0.5 to 1.5 millimeters, the dry thickness generally being in the same range.

The dry, solid hexahydric alcohol matrix and the finely divided pigment it contains is a coherent mass which tends to be brittle rather than flexible. This brittleness is an advantage in terms of the ease with which a thin layer of matrix can be broken into flakes or chunks with standard techniques involving rotating drums with stationary plows, flexible substrates, etc. These standard comminution techniques can produce a wide range of particle shapes and sizes wherein a small amount of small crumbs or "fines" may be mixed with larger chunks or flakes, some of these larger particles being retained even on a 3 mesh (U.S.) screen. Classification by screening or other conventional techniques can narrow the size range. Ordinarily, however, the very large (e.g. +3 mesh) particles are not objectionable, and whatever "fines" may be present are unlikely to be subject to "dusting" to any significant extent. If desired, the "fines" (if any) can be continually classified out and recycled in the process to provide a product which is uniformly larger than a desired mesh size. Conversely, over-size particles can be screened out and pulverized. In short, there are few, if any, inherent limitations on the size range of the product, and the size range can be tailored to the desired end use with negligible waste of material.

The morphology of the product can vary depending on process conditions. It is believed that the adherent binder matrix (i.e. the solid hexahydric alcohol phase) is essentially (and preferably) crystalline. Some polyhydric alcohols such as sorbitol may, under certain conditions, form an amorphous or disoriented solid (analogous to soda-lime glass). Crystallization can occur upon resolidification of a molten hexahydric alcohol mass, upon evaporation of solvent (i.e. the water in the carrier medium), or upon any desired combination of the two. The molten, wet, or dry mass of hexahydric alcohol is preferably not subjected to superatmospheric pressure and should have a normal crystalline structure. As mentioned previously, hexahydric alcohols or mixtures thereof (or mixtures with compatible solid diluents) can reduce crystallinity or even favor the formation of an amorphous solid, but there appears to be no advantage to such a reduced degree of crystallinity. In prior art tablet-making and tablet-coating techniques, mannitol has been used as a coating agent or a binder and has been placed under pressure. These prior art techniques appear to be less effective, in the context of this invention, when compared to the casting and drying technique described subsequently.

The Preferred Process

In the first step of the preferred process, the hexahydric alcohol is blended with the finely divided material (e.g. pigment). These two ingredients can be dry blended and then mixed with water to form the suspension or slurry which is cast onto the release substrate. Alternatively, the aqueous carrier (water, water containing a surfactant, an ammoniacal solution, or the like) can be the medium in which mixing takes place. It is ordinarily preferred that sufficient water be used to totally dissolve the hexahydric alcohol, so that the aqueous carrier medium becomes a solution of hexahydric alcohol in which the finely divided pigment is suspended, slurried, dispersed or emulsified. If desired, dissolving of the hexahydric alcohol with water can be speeded up with mild heating. It is preferable to wet the pigment particles to a high degree, and any suitable wetting agent or wetting means can be used for this purpose, i.e. a means for reducing the surface tension of water. Among the preferred wetting agents are the surface active compounds containing oxyethylene units such as fatty acid esters of poly(oxyethylene) sorbitan. Suitable commercially available wetting agents include the "Tweens" and "Spans" (trademarks). Adequate wetting can be obtained with heating of the aqueous carrier medium, pH control or alteration, removal or sequestration of water hardness (calcium and magnesium ions), high speed agitation, and the like. Some gases such as ammonia, when dissolved in water, can assist in the wetting action, but some of the properties of ammonia (odor, etc.) are, or may be, objectionable.

As pointed out previously, the amount of water used in the aqueous carrier medium is not critical, so long as certain minimum amounts of water are present, as outlined previously.

The next step of the process involves casting the mixture, (i.e. the finely divided pigment uniformly distributed in the aqueous carrier medium) onto a substrate. The nature of the substrate is not critical, so long as it does not form a permanent bond with the ultimately obtained dried layer. Stated another way, the substrate serves as a temporary support means and should have some release characteristics. Any of a variety of flexible belts, rotating drums, foraminous surfaces, polished or plastic-coated metal sheets or trays, plastic films, webs (woven or nonwoven), and the like can have sufficient release characteristics. From the standpoint of efficiency, a moving endless belt or web or a rotating drum are desirable, since they lend themselves to a substantially continuous process wherein the aqueous mixture is cast in a continuous phase to the desired wet thickness; the wet layer is passed through a heating zone for drying and solidification; and the dried, solid layer is removed from the moving drum or web by a scraping and/or flexing and/or agitation step (or any other step which creates disruption of the dried layer), thereby comminuting and removing the dried, solid layer in a single step.

Drying of the wet layer can take place at normal ambient (i.e. atmospheric) pressure or at sub-atmospheric pressures. Under vacuum or reduced pressure, of course, the boiling temperature would be lowered and the rate of evaporation increased for a given temperature. Thus, the rotating drum (for example) can be placed within a hermetic enclosure maintained at reduced pressure. The enclosure can be constructed and arranged to permit introduction of the fluid mixture into the drum.

In a preferred form of this continuous operation, a slowly turning drum-flaker is used, the Goslin drum flaker made by Goslin-Birmingham, Inc., of Alabama, being typical of such devices. In this embodiment of the invention, the drum is charged with the fluid mixture, the fluid in the drum is doctored to the desired thickness, and as the drum surface travels upward, the cast and doctored layer is passed through the heating zone. Heat can be applied to one or both surfaces of the drum, or directly to the cast layer, by any suitable heating means, including hot gas or hot air, infra-red radiation, microwave heating, or the like. As the drum continues to rotate, it can pass through a cooling zone, wherein cooling is provided by cold air, cold gas, refrigeration of the drum surface, or the like. Still later in the cycle of rotation, a discharge zone is provided. In the discharge zone, the solid layer emerging from the cooling zone is peeled and cracked free from the drum surface, e.g. with a device known in the art as a plow. If the drum surface is foraminous, removal of the dried layer can be facilitated with a flow of air through the holes in the drum surface. Conventional classification follows after discharge of the comminuted dried layer. As mentioned previously, over-size particles can be pulverized and under-size particles can be recycled.

The solidification or congealing (e.g. crystallization) of the dried layer can be achieved by a variety of techniques. Evaporation of water, by itself, can induce the desired solidification. If this technique is used, it is preferred to heat the hexahydric alcohol matrix to a peak temperature which is slightly below the melting point for the hexahydric alcohol or mixture of hexahydric alcohols selected for use in the process. For mannitol-sorbitol combinations, this peak temperature would range from below 91° C. (for 100% sorbitol hydrates) up to slightly below 166° C.; however, it is also preferred that the peak temperature is above the boiling point of water, i.e. above 100° C. This presents no problem, even for a 100% sorbitol system, since anhydrous sorbitol melts at 110°–112° C. Accordingly, the preferred peak temperature for mannitol and/or sorbitol systems ranges from about 110° C. to about 145° C.

Even in the solidification-by-evaporation techniques, however, the peak temperature may rise above the melting point of mannitol for brief periods, e.g. temperatures up to 200° C.

In a second technique of solidification, the hexahydric alcohol becomes a liquid or molten phase and then congeals or solidifies or precipitates (e.g. crystallizes) upon freezing. In this technique, there is virtually no upper limit on the peak temperature, except for the decomposition temperature or boiling temperature of the hexahydric alcohol. For all practical purposes, it can be assumed that the decomposition temperature would be reached first, at least under normal atmospheric conditions.

No matter what solidification or drying technique is used, it is preferred to dry the product until it is essentially free of any chemically unassociated water, e.g. until it contains less than 0.5% chemically unassociated water. In other words, it is preferred that only incidental amounts of chemically unassociated water remain after drying.

The exact conditions under which crystallization occurs are not fully understood. Unless heating of the hexahydric alcohol to the molten stage is specifically attempted, crystallization may begin before the wet layer of cast material is fully dried. When hexahydric alcohol fusion is used, however, it is assumed that crystallization from the hot melt does not occur until substantially all chemically unassociated water has been driven off.

Within the broad limits described previously, heating and cooling times and temperature are dictated more by the design of the equipment used than by any other factor, particularly in the case of the rotating drum technique. If an endless belt is used, heating times can be controlled by the speed of the belt and the length of a heating tunnel through which the belt passes.

In the following non-limiting Examples, the principles and practices of this invention are illustrated. Unless otherwise indicated, all parts and percentages in these Examples are by weight.

EXAMPLE 1

In this Example, the following aqueous pigment suspension was prepared:
- 58.28% pigment
- 3.07% mannitol
- 38.65% water Ammonium hydroxide was added to the water for improved wetting of the pigment.

After drying and heating in accordance with the method of this invention, coherent pigmented flakes were obtained. The pigmented flakes were suitable for use as a pigment in plastic compounding and molding.

EXAMPLE 2

The following aqueous mixture was prepared:
- 45.96% pigment
- 48.88% water
- 2.41% mannitol
- 2.75% "Tween" 21; trademark for poly(oxyethylene sorbitan monolaurate After drying and heating, the anhydrous formula was:
- 89.87% pigment
- 4.72% mannitol
- 5.41% "Tween" 21 (Trademark)

The resulting flakes had good coherence. The fire point of the flakes was 495° F.; the flash point was 410° F.

EXAMPLE 3

This formula was essentially 95% pigment and 5% mannitol. A small amount of "Span" 20 was added for increased wetting. "Span" is a trademark for sorbitan monolaurate. The pigment, mannitol, and water were heated and mixed at 200° F.; the heating was helpful in providing a good dispersion. The resulting flakes also had a high flash point and a high fire point, the fire point being 440° F.

EXAMPLE 4

The flakes of this Example were prepared from:
- 2.80% powdered sorbitol
- 1.68% "Brij" 30, trademark for poly(oxyethylene) lauryl alcohol
- 42.13% water
- 53.39% finely divided pigment The resulting flakes had a melting point of 212° F. (100° C.). The higher melting points provided by mannitol-containing compositions are generally better suited to plastic coloration applications.

A comparison was made using a 70% aqueous sorbitol solution in sufficient quantity to provide a flake with a 23.4% sorbitol content (dry basis). The results were inferior as compared to formulas containing less than 20% sorbitol on a dry basis.

EXAMPLE 5

A comparison test demonstrated that a procedure involving compression did not produce a coherent flake. The formula, pressure, and temperature used in this comparison are given in the table below:

| Formula | Pressure | Temperature | Results |
|---|---|---|---|
| 98.04% dry pigment<br>1.96% dry mannitol | 10,000 p.s.i.<br>(700 kg/cm$^2$) | 350° F.<br>(177° C.) | Not coherent |

What is claimed is:

1. A flake-like, particulate mass consisting essentially of coherent, brittle flakes having a dry thickness in excess of about 25 microns, said coherent, brittle flakes consisting essentially of:
   (a) about 2 to about 20 weight-% of a solid, non-toxic, biodegradable, water-soluble, essentially crystalline hexahydric alcohol matrix which is essentially free of chemically unassociated water, said hexahydric alcohol comprising a major amount of mannitol blended with sorbitol, and
   (b) entrapped within and uniformly distributed through said matrix, about 80 to about 98 weight-% of solid particles having an average particle size less than 5% of the thickness of said flakes, said particles being insoluble in said matrix and being generally inert toward water and hexahydric alcohols and generally water-insoluble and having a melting point greater than 100° C.

2. Flake-like mass according to claim 1 wherein a major amount of said particles are smaller than 100 microns in size, and wherein said thickness of said flakes exceeds 75 microns.

3. Flake-like mass according to claim 1 wherein said particles comprise elemental carbon.

4. A flake-like particulate mass consisting essentially of coherent brittle flakes having a dry thickness in excess of 25 microns, said flakes comprising a crystalline hexahydric alcohol matrix comprising a major amount of mannitol and generally water-insoluble particulate solids distributed through said matrix, said particulate solids being insoluble in said matrix, generally inert toward water and hexahydric alcohols, and having a melting point above 100° C., the size of said particulate solids being less than 5% of the thickness of said flakes, said flake-like particulate mass having been made by a process comprising the following steps:
   (a) dissolving about 2-20% by weight of a hexahydric alcohol comprising a major amount of mannitol in an aqueous carrier medium, the amount of water in said aqueous carrier medium being sufficient to provide at least 100 parts by weight of water per 21.3 parts of weight of hexahydric alcohol dissolved in said aqueous medium;
   (b) dispersing 80-98% by weight of said particulate solids in said hexahydric alcohol-aqueous medium, whereby a castable blend comprising said particulate solids, said hexahydric alcohol, and water is obtained, the amount of water being at least 40 parts by weight per hundred parts by weight of said particulate solids;

(c) casting a continuous wet layer of said blend formed in step (b) onto a substrate to form a continuous wet layer of 0.1–5 millimeters in thickness;

(d) heating said wet layer to a peak temperature in excess of the boiling temperature of water, said temperature being selected such that, when said temperature is reached and thereafter lowered, said hexahydric alcohol will come out of solution to form a solid hexahydric alcohol matrix containing therein said particulate solids in suspension, said particles being insoluble in said matrix, said exposure to temperatures in excess of the boiling temperature of water being sufficient to assure that said matrix contains less than 0.5% chemically unassociated water by weight;

(e) removing the resulting coherent dried layer from said substrate; and (f) comminuting said coherent dried layer to form said flake-like particulate mass consisting essentially of flakes having a thickness less than that of said continuous wet layer.

5. Flake-like mass according to claim 1 wherein said essentially hexahydric alcohol matrix consists essentially of a 75:25 blend, by weight, of mannitol:sorbitol.

6. A flake-like particulate mass consisting essentially of coherent, brittle flakes having a dry thickness in excess of 25 microns, said flakes comprising a crystalline hexahydric alcohol matrix comprising a major amount of mannitol and generally water-insoluble particulate solids distributed through said matrix, said particulate solids being insoluble in said matrix, generally inert toward water and hexahydric alcohols and having a melting point above 100° C., the size of said particulate solids being less than 5% of the thickness of said flakes, said flake-like particulate mass having been made by a process comprising the following steps:

(a) blending components comprising (1) about 2–20% by weight of a hexahydric alcohol comprising a major amount of mannitol, (2) about 80–98% by weight of said particulate solids and at least about 40 parts by weight of water per one hundred parts by weight of said particulate solids;

(b) casting a continuous wet layer of the mixture formed in step (a) onto a substrate to form a continuous wet layer of 0.1–5 millimeters in thickness;

(c) heating said wet layer to a temperature above the melting point at normal ambient pressure but below the degradation temperature of the hexahydric alcohol, (1) until a relatively dry layer is obtained, said dry layer being essentially free of chemically unassociated water, and (2) until the hexahydric alcohol in said relatively dry layer is essentially anhydrous and in a molten state;

(d) solidifying said hexahydric alcohol in situ in said layer to form a matrix comprising a solid suspension of said particulate solids within an enclosing matrix of coherent solid polyhydric alcohol, said particulate solids being insoluble in said matrix;

(e) removing the resulting coherent dried layer from said substrate; and (f) comminuting said coherent dried layer to form generally randomly shaped, flake-like particles, said particles being essentially free of chemically unassociated water.

7. Flake-like mass according to claim 1 wherein said flakes contain up to about 10% by weight of a surfactant.

8. Flake-like mass according to claim 4 wherein said flakes contain up to about 10% by weight of a surfactant.

9. Flake-like mass according to claim 6 wherein said flakes contain up to about 10% by weight of a surfactant.

* * * * *